July 14, 1936.                C. A. KALINA                2,047,417
ANIMAL TRAP
Filed May 2, 1935
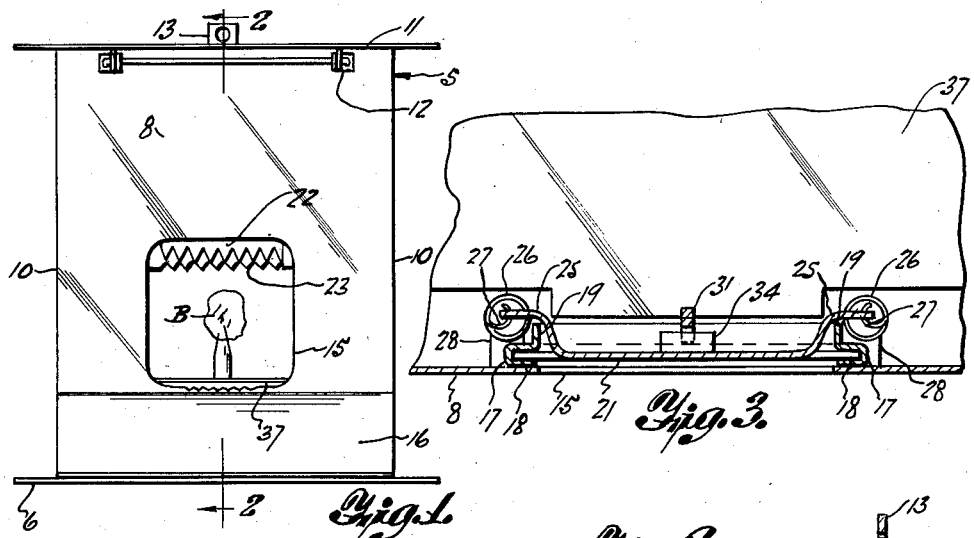
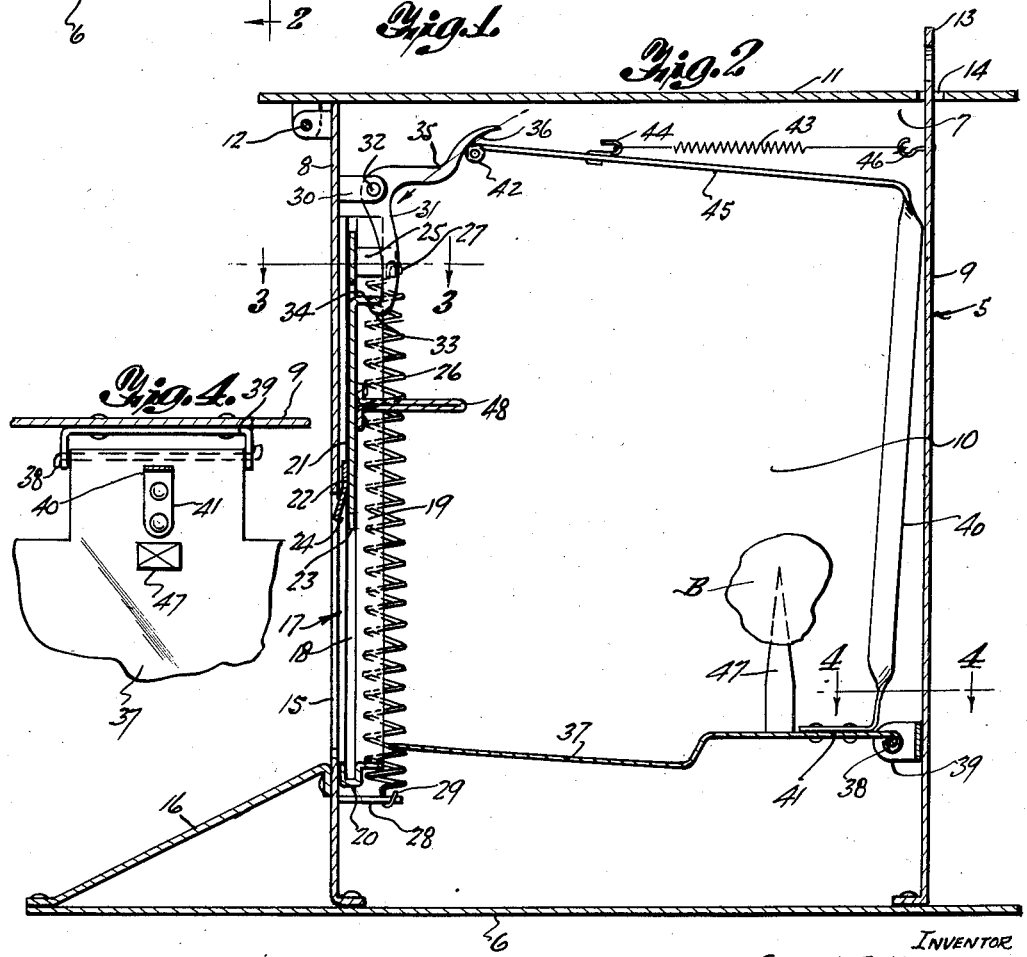
INVENTOR
CHARLES A. KALINA
By Adam E. Fisher
ATTORNEY Patented July 14, 1936

2,047,417

UNITED STATES PATENT OFFICE 2,047,417

ANIMAL TRAP

Charles A. Kalina, Exeter, Nebr.

Application May 2, 1935, Serial No. 19,350

1 Claim. (Cl. 43—78)

My invention relates to improvements in animal traps and the main object is to provide a trap in a simple, practical and efficient form which will impale and instantly kill any animal entering the trap in the attempt to reach the bait therein.

Another object is to provide a trap of this kind comprising a housing having an entrance, a trap door mounted to slide down over said entrance and spring set to normally close the same, a trigger crank pivoted over the door and adapted when set to hold said door open, and a trip pan hinged in the bottom of the housing within the entrance and arranged as the animal enters and rests its weight in the pan to release the trigger and allow the door to be spring closed.

With these and other objects in view the invention resides in the novel construction and arrangement of parts as hereinafter fully set forth and claimed, reference being had to the accompanying drawing wherein:

Figure 1 is a front elevation of the trap.

Figure 2 is an enlarged section along the line 2—2 in Figure 1.

Figure 3 is a horizontal section along the line 3—3 in Figure 2.

Figure 4 is a horizontal section along the line 4—4 in Figure 2.

Referring now with more particularity to the drawing my invention comprises a housing 5 of any suitable size and material closed at its underside by a bottom plate 6, open at its top 7 and including the upstanding front 8, back 9 and sides 10. A cover 11 is hinged at 12 to the top of the housing and when closed covers the open upper end 7 thereof and may be locked by a pin or padlock (not shown) passed through the apertured ear 13 extended from the housing back 9 up through a slot 14 in the cover as shown. An entrance or opening 15 is formed in the front 8 some distance above the bottom 6 and an inclined ramp or step 16 leads from the bottom up to the lower side of this entrance.

Guides 17 are mounted in parallelism vertically within the housing on the inner face of the front 8 at each side of the entrance 15 and as shown, are made up of folded metal strips each bent to form a cleft or slideway 18 and an inwardly projecting guard lip or web 19.

Said guides 17 are joined by a similar guide or bottom piece 20 below the door and this may be a continuation of the guides and the whole structure be of U-shaped form as will be understood. A rectangular trap door 21 is slidably mounted at its margins in the guideways 18 and arranged to fully slide therein to move up or down and open or close said entrance 15. A serrated or toothed plate 22 is secured to the lower, outer side of the door 21 and the lower margin of the door is similarly toothed and serrated as at 23 for the purpose of impaling an animal as the door closes as will hereinafter become apparent. It will be noted that the lower margin of the plate 22 is bent outward and spaced from the door bottom forming a cleft 24 whereby a better "grip" is obtained upon the animal caught in the trap.

Adjacent its upper edge the door 21 has outwardly bent spring mounting ears 25 turned out and over and clearing the guard lips 19 and retractile coil springs 26 are hooked at 27 to these ears and lead down along and outwardly of the lips 19 to ears 28 bent inward or affixed to the front 8 of the housing below the entrance 15 where the springs are hooked at 29 and placed under tension to normally pull the trap door forcibly down in its guides 17.

A bracket 30 is mounted on the housing front 8 above the position assumed by the door 21 when same is raised to completely clear the opening 15 and a trigger or trigger crank 31 is fulcrumed at 32 to this bracket. At its lower end the trigger 31 has a hook 33 adapted to engage the underside of a catch 34 which is punched inward from the door 21 near its upper edge and when engaged the trigger then holds the door in open or "set" position. The trigger 31 also has an upwardly and inwardly directed release arm or finger 35 curved and bent as shown to provide an arcuate or concave under face 36.

A trip pan or plate 37 is hinged at its rear edge by a pin 38 passing through a bracket 39 secured to the housing back 9 and from this hinge extends forwardly toward the lower side of the entrance 15. An L-shaped lever 40 is secured by one end 41 to the trip pan 37 adjacent the hinge 38, 39 and extends upwardly and then forwardly terminating adjacent the release arm 35 of the trigger 31 at which end the lever has a roller 42 designed to engage and ride the aforesaid concave face 36. A light retractile coil spring 43 is hooked at 44 to the forwardly turned arm 45 of the lever 40 and extends back therefrom to a hook 46 secured in the housing back 9. The bait B of any suitable form is secured or placed on a spike 47 mounted on the trip pan 37 near the rear. The spring 43 normally raises the pan 37 an amount limited by the lever 40 striking the back of the housing.

In use, the cover 11 is opened and the trap door 21 is raised (as by a handle 48 secured thereto) until the trigger 31 may engage the catch 34 and hold the door in this opened or "set" position.

Now as the animal enters the opening 15, or starts to, its weight coming to rest on the front end of the trip pan 37 depresses the same and swings the frontal end of the lever 40 forward and downward as indicated by the arrow in Figure 2. This causes the roller 42 to raise the finger 35 and swing the trigger 31 free of the catch 34 so that the springs 26 forcibly close the trap door 21 and impale and almost, if not actually, kill the animal at once. Of course, the tension of the spring 43 must be such as to just overcome the weight of the trip pan 37 and hold the parts in set position. This trap is simple, efficient and humane in construction and operation and, of course, may be made up in any convenient and practical size.

While I have herein set forth a certain preferred embodiment of my invention, it is understood that I may vary from the same in minor structural details, so as best to construct a practical device for the purpose intended, not departing from the spirit of the invention and within the scope of the appended claim.

I claim:

In a trap embodying a housing having a door opening thru one side, folded metal guide strips mounted in parallelism at each side of the door, the same including guide-ways and inwardly projected guard ribs, a similar strip mounted below the door, a trap door slidably mounted at its margins in the said guide ways of the guide strips and adapted to seat at its lower margin in the strip below the door opening when the door is closed, the lower margin of the door having a double row of teeth extended there along, spring mounting ears projecting inwardly from the upper corners of the door the said ears being disposed laterally of the guard lips of the guide strips, auxiliary spring mounting ears extended inwardly from the housing laterally of the lower portion of the door opening and of said guard lips and arranged in perpendicular alignment with the first named upper pair of ears, retractile coil springs stretched perpendicularly between said mounting ears laterally of the guard lips of the guide strips whereby the springs are concealed from an animal entering the door, a trigger pivotally mounted on the housing centrally over the door opening and arranged to oscillate in a plane perpendicular to the door, co-operative elements on door and trigger for mutual, releasable engagement, an elongated trip pan hinged at its rear end inside the housing at the back thereof in longitudinal alignment with the door, the forward end of the trip pan being disposed immediately inside the lower side of the door opening, an inverted L-shaped lever anchored at one end to the rear portion of the trip pan forwardly of its hinged mounting, the free arm of this lever being extended forwardly and arranged to impinge the said trigger to release same from the trap door upon the forward movement of the lever as caused by an animal stepping upon the trip pan, and means for resiliently retracting the lever to clear the trigger.

CHARLES A. KALINA.